Nov. 20, 1934.                K. F. MOLLER                1,981,147
                       MACHINE CONTROL MECHANISM
                         Filed Jan. 13, 1933
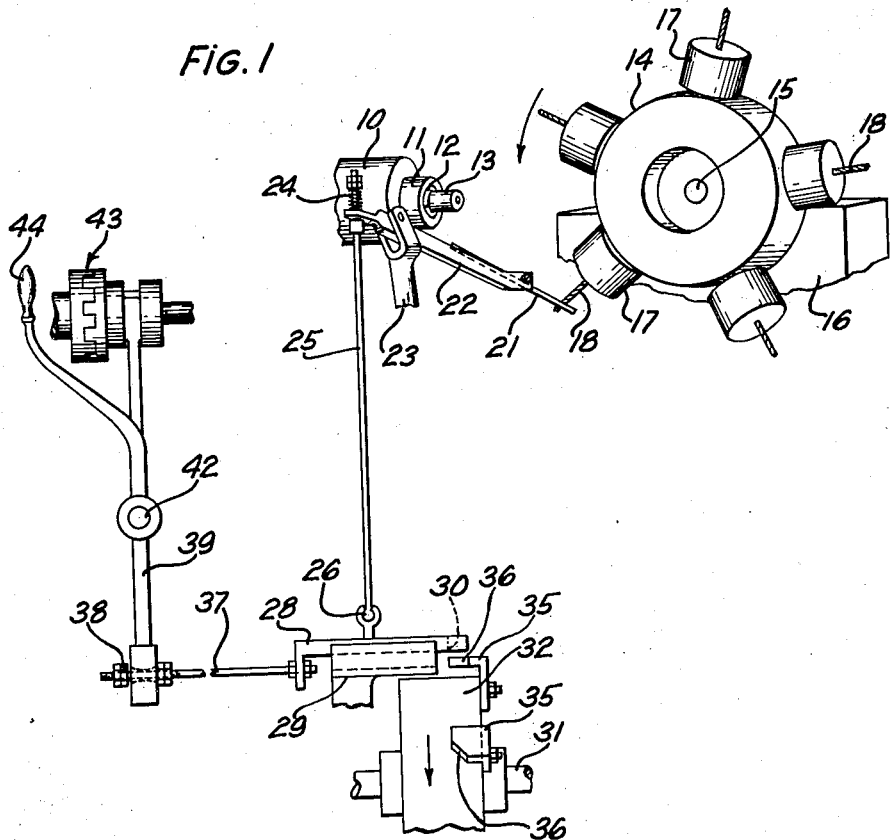
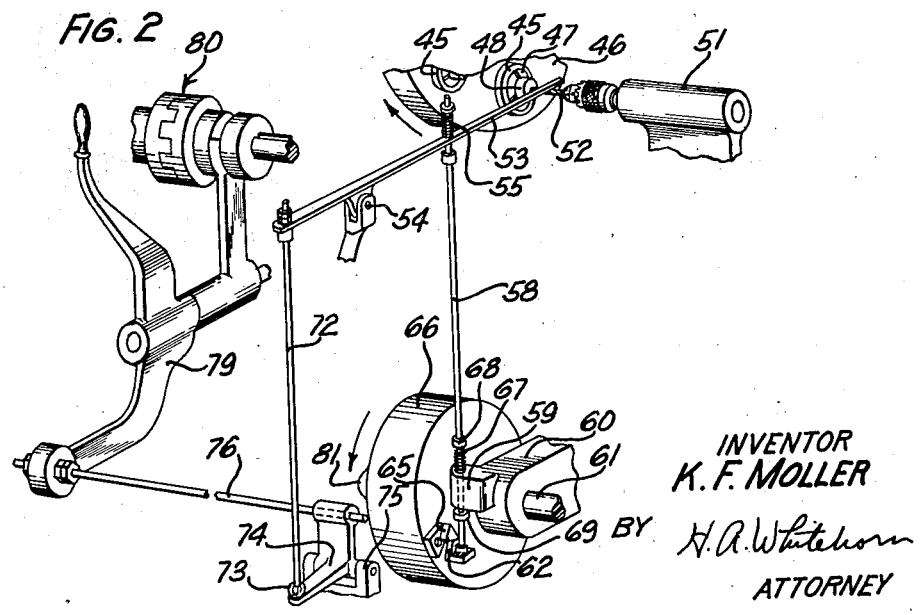
INVENTOR
K. F. MOLLER
BY H. A. Whitehorn
ATTORNEY Patented Nov. 20, 1934

1,981,147

UNITED STATES PATENT OFFICE 1,981,147

MACHINE CONTROL MECHANISM

Kasper F. Moller, Cicero, Ill., assignor to Western Electric Company, Incorporated, New York, N. Y., a corporation of New York Application January 13, 1933, Serial No. 651,473

13 Claims. (Cl. 29—44)

This invention relates to machine control mechanisms, and more particularly to stop mechanisms for automatic screw machines and similar equipment.

An object of the invention is to provide a simple and efficient mechanism for controlling the operation of machines.

One embodiment of the invention contemplates the provision in automatic screw machines of mechanism for automatically stopping the machine in the event that a tool becomes damaged or broken, thereby preventing damage to succeeding tools and reducing to a minimum the number of defective parts produced by the machine. In one form of the invention as applied to screw machines of the type wherein a plurality of tools are successively indexed into operative relation with respect to the work, the stop mechanism is rendered effective by a broken tool for preventing operative engagement of succeeding tools with the work, while in another form of the invention the stop mechanism prevents operative engagement of the broken tool with succeeding work pieces or reengagement of the broken tool with the same work.

Other features and advantages of this invention will more fully appear from the following detailed description taken in connection with the accompanying drawing, wherein Fig. 1 is a diagrammatic view of an automatic safety stop mechanism embodying the features of this invention shown applied to an automatic screw machine, the stop mechanism and associated elements of the machine being shown fragmentarily with portions of the stop mechanism in perspective to more clearly illustrate the invention, and Fig. 2 is a perspective view of another form of automatic stop mechanism embodying the invention.

Referring now to the drawing, and more particularly to Fig. 1, the numeral 10 designates a portion of the spindle head of a conventional high speed single spindle screw machine. A work holding spindle 11 is rotatably carried in the head, the spindle terminating in a chuck 12 designed to receive and securely clamp therein a bar of stock material or an article 13 to be worked on or formed. A tool carrying turret 14 is mounted for rotation about a horizontal axis indicated at 15 on a bearing block 16, shown fragmentarily, and slidably mounted in the usual manner in machines of this type. The turret 14 is provided with a plurality of chucks 17 for holding five tools, in the present instance five drills 18 are illustrated. By mechanism, well known in the art, the slidable bearing block 16 carrying the turret 14 is periodically advanced and retracted in timed relation with respect to the intermittent indexing of the turret to operatively aline the tools or drills 18 successively with the article 13 carried by the work holding spindle 11, which is continuously rotated in the operation of the machine. Also during one of the tool indexing movements of the turret 14 the bar of stock 13, after the formed end thereof has been cut off by a suitable laterally advanced tool (not shown), is advanced a predetermined distance longitudinally of the spindle 11 to present another portion thereof to be formed. In the case of a partially formed article to be worked on the article is loaded into the spindle chuck either manually or automatically from a magazine, and after completion of the operations thereon by the drills 18, the article is ejected from the spindle chucks automatically. Since the means for accomplishing these operations are well known in the art and constitute no part of the present invention, and are not necessary to a complete understanding thereof, they have not been disclosed.

In the operation of high speed automatic screw machines of the type previously described the breaking of a drill, tap or other tool in the set up of tools carried on the turret 14 during the operation thereof on the bar of stock material or article 13 frequently is not noticed by the operator and before the operation of the turret is stopped, the succeeding drills are indexed and advanced to the article and broken off by their engagement with the broken off portion of the previously indexed and advanced tool or drill 18 remaining in the article.

In order to prevent the breaking of succeeding tools or drills 18 after one of them has been broken and the production of defective articles 13 a mechanical safety stop mechanism is provided for automatically stopping the operation of the turret 14 during the indexing of the broken drill 18 from alinement with the article and the indexing of the succeeding drill into operative alinement with the article. This mechanism includes a pivotal feeler member 21 having its free end positioned at a suitable angle to and in the path of the drills 18 as they are successively indexed after their operation on the article. The feeler member 21 comprises a length of drill rod adjustably carried on a lever 22 pivoted to a bracket 23 fixed to the frame of the screw machine. Yieldably connected, as indicated at 24, to a short arm of the lever 22 is a vertical rod 25, which freely extends through an aperture in the arm, the lower end of the rod being connected by a ball and socket connection 26 to a horizontally disposed member 28 freely slidable in a guide way provided in a bracket 29 fixed to the frame of the screw machine. At its right end the member 28 projects from the bracket 29 and is formed with a vertical cam surface 30 (dotted outline).

Fixed to and rotating with a cam shaft 31 of the screw machine is a carrier 32 to which is fixed a set of predeterminedly spaced trip dogs 35, one for each drill 18, or other tool, carried by the turret 14. The right end of the slidable member 28 when the member is positioned at the bottom of the guideway in the bracket 29, shown in the drawing in a raised position, lies in the path of the moving trip dogs 35, the trip dogs each having a cam surface 36 for engaging the cam surface 30 on the slidable member 28. At its left end the slidable member 28 is rigidly attached to a rod 37, the opposite end of the rod being connected at 38 to a clutch operating lever 39 suitably pivoted on the screw machine frame, as indicated at 42. The connection 38 between the lever 39 and the rod 37 is such that the rod may freely move upwardly and downwardly at its right end in its movement with the slidable member 28, in response to a similar movement of the rod 25, in a manner to be presently described, and can also serve to move the lever 39 about its pivot 42 when the rod is shifted longitudinally, in response to a similar movement of the slidable member 28, when the trip dogs engage the right end of the slidable member. At its upper end the clutch operating lever 39 is operatively associated with a jaw type clutch indicated in general at 43 for connecting or disconnecting the drive to the turret 14 which controls the indexing and advance movements of the turret. Connected to move with the clutch operating lever 39 is a hand lever 44 for opening the clutch 43 independently of the actuation of the automatic safety stop mechanism to interrupt the operation of the turret 14 and for closing the clutch and resetting the stop mechanism after an actuation thereof.

In the operation of the screw machine after each operation of a tool or drill 18 on the continuously rotating article 13 the turret 14 is retracted to withdraw the drill from the article and as soon as the drill is clear of the article the turret is indexed in the direction of the arrow to aline the next succeeding drill with the article. During this indexing movement of the turret 14 the drill 18 just previously used on the article moves into engagement with the free end of the feeler member 21 positioned in the path of the drill. The position of the feeler member 21 relative to the path of the drill 18 is such that in the movement of the drill past the feeler member there occurs a wiping or sliding engagement between the outer end of the drill and the feeler element. As a result of this engagement between the drill 18 and the feeler member 21 the pivotal lever 22 is rotated clockwise about its pivot, thereby moving the rod 25 and the member 28 attached thereto upwardly to the position shown in the drawing wherein the right end of the member has been withdrawn from the path of the adjacent advancing trip dog 35 carried on the rotating carrier 32. As shown in the drawing the feeler member 21 and the drill 18 are still in engagement and it is to be understood that before the drill is disengaged from the feeler member in the continued indexing movement of the drill, which disengagement permits the member 28 to return to its lower position, by the action of gravity, to the bottom of the guideway in the bracket 29, the trip dog 35 will have moved past the member 28, the movements of the turret 14 and the cam dog carrier 32 being synchronized to give this action. Thus no engagement between the cam surface 36 of the trip dog 35 and the cam surface 30 of the slidable member 28 occurs and consequently the clutch 43 is not opened to interrupt the drive to the turret.

In case the drill 18 being indexed in the manner previously described was broken during its operation on the article 13, the feeler member 21 will not be engaged thereby, and as a result the slidable member 28 will remain in its lower position in the guideway of the bracket 29 with its cam surface 30 lying in the path of the adjacent trip dog 35 being advanced by the rotating carrier 32. The advancing trip dog 35 moves into engagement with the slidable member 28 and the cooperating cam surfaces 36 and 30 on the trip dog and the member, respectively, cause the member 28 which is guided in the bracket 29 to move to the left and by means of the rod 37, interconnecting the member and clutch operating lever 39, the clutch operating lever is instantly rotated clockwise about its pivot 42 to open the clutch 43. The drive to the turret 14 is thus interrupted before the succeeding drill 18 or other tool is indexed and advanced into operative relation with the article 13 carrying the portion of the broken drill. In case the article 13 carrying the portion of the broken drill 18 has been removed from the chuck 12 of the work holding spindle 11 in the automatic operation of the screw machine the broken drill is prevented from being advanced into operative engagement with another article clamped in the chuck, which engagement would result in the production of a defective article. After the removal and replacement of the broken drill 18 the hand lever 44 is moved counterclockwise about the pivot 42 to close the clutch 43 and the turret 14 again operates. In closing the clutch 43 it will be obvious that the slidable member 28 is returned to its normal position with its right end projecting into the path of the trip dogs 35 on the carrier 32.

The mechanical safety stop mechanism illustrated in Fig. 2 is shown applied to a multiple-spindle automatic screw machine of the type wherein a plurality of equally spaced rotary work holding spindles, indicated at 45, are carried in a rotary head 46, fragmentarily shown, each spindle terminating in a chuck 47 for holding a bar of stock material or an article 48 to be worked on or formed. A tool head is indicated at 51 and supports a single tool or drill 52, the tool head being mounted on the usual tool carrying slide (not shown) employed in screw machines of this type. By mechanism well known in the art, the tool carrying slide is periodically advanced and retracted to carry the drill 52 toward and from the work holding spindles 45 and in timed relation with respect to an intermittent indexing of the spindles, in the direction of the arrow, to successive positions to aline an article 48 with the drill 52.

The mechanism shown in Fig. 2 includes a pivotal feeler member 53 having its free end positioned at a suitable angle to and over the path of movement of the drill 52 and normally spaced slightly from the drill during its advance to and its operation on the article 48, and during the retraction of the drill from the article the feeler member is positively actuated to cause its free end to move into engagement with the outer end of the drill. The feeler member 53 is pivoted as indicated at 54 and has yieldably connected thereto, as indicated at 55, between its pivot and its free end, a vertical rod 58 which freely extends through an aperture in the member 53, so that the rod may be moved downwardly without the feeler member being moved about its pivot after the member engages the drill 52. At its lower end the rod 58, which is slidably fitted in an offset bearing 59 integral with a bearing 60 for a cam shaft 61 of the screw machine, is provided with a cam member 62 which is adapted to be engaged at predetermined intervals in synchronism with the retraction of the tool or drill 52 from the article 48 by an advancing trip dog 65 carried on one end of a carrier 66 rotating with the cam shaft 61. A suitable compression spring 67 surrounding the rod 58 between the bearing 59, and a collar 68 adjustably fixed to the rod serves to normally urge the rod upwardly, the upward movement thereof being limited by an adjustable stop collar 69 fixed to the rod and bearing against the lower end of the bearing 59. The collar 69 is adjusted on the rod 58 to normally space the underside of the feeler member 53 slightly from the drill.

Extending loosely through an aperture in the short end of the pivotal feeler member 53, but connected to move upwardly and downwardly therewith in its pivotal movement is a vertical rod 72 connected at its lower end by a ball and socket connection 73 to an arm of a bell crank lever 74 pivoted to a bracket 75. Reciprocably mounted in the other arm of the lever 74 is a rod 76 connected at its left end, in a manner similar to that of the rod 37 of Fig. 1, to a clutch operating lever 79 arranged and operable to control a clutch 80 in a manner similar to that described in connection with Fig. 1, for connecting or disconnecting the drive to the tool head 51 for controlling the periodic advance and retraction of the tool head. Secured to the left end of the rotating carrier 66 is a trip dog 81 which is advanced into engagement with the right end of the rod 76 in one position of the bell crank lever 74, to be referred to hereinafter, to cause the rod 76 to be shifted toward the left, thereby opening the clutch 80.

In the operation of the screw machine and in synchronism with the retraction of the drill 52 from the article 48 the feeler member 53, which is slightly spaced from the drill, is moved downwardly into engagement therewith by the advancing trip dog 65 on the carrier 66 engaging the cam member 62 on the rod 58 yieldably connected to the feeler member. The upward movement of the left end of the feeler member 53 at this time is not sufficient to cause the bell crank lever 74, connected to the feeler member by the rod 72, to position the right end of the rod 76 in the path of the advancing trip dog 81 on the carrier 66 and consequently the rod 76 is not shifted to open the clutch 80 to interrupt the drive to the work head 46 and the tool head 51 and the operation of the machine continues. If the drill 52 being retracted from the article 48 is broken no engagement between the feeler member 53 and the drill occurs and as a result the left end of the feeler member is moved upwardly a distance sufficient to cause the bell crank lever 74 to position the right end of the rod 76 in the path of the advancing trip dog 81, which in its advance shifts the rod 76 to the left. This movement of the rod 76 it will be apparent opens the clutch 80 in the manner previously described in connection with Fig. 1 to interrupt the drive to the work head 46 and the tool head 51.

Although the embodiments of the invention as herein illustrated and described are particularly well adapted for use in connection with certain types of automatic screw machines, it should be understood that the novel features thereof are not limited to the specific applications, but are capable of numerous other applications and should be limited only by the scope of the appended claims.

What is claimed is:

1. In an article forming apparatus, a forming tool, means for moving said tool into operative engagement with an article, and means including an element normally positioned in the path of movement of said tool responsive to an engagement of said tool therewith during its movement past the element for controlling the operation of said tool moving means.

2. In an article working apparatus, a tool supporting member, a tool carried thereby, means for causing a relative movement of the tool supporting member and an article for operatively engaging the tool with the article, a stop mechanism normally maintained in an operative condition for stopping the apparatus prior to the engagement of the tool with the article, and means under the influence of the tool during said relative movement for controlling the operation of said stop mechanism.

3. In an article working machine in which a plurality of tools are successively moved into operative engagement with an article, a stop mechanism normally maintained in an operative condition for stopping the machine prior to the engagement of each tool with the article, and means under the influence of the tools during their movement for controlling the operation of the stop mechanism.

4. In an article forming apparatus, a forming tool, means for moving said tool in one direction into predetermined relation with and subsequently in another direction into operative engagement with an article, and means including an element normally positioned in the path of said tool during its first movement responsive to an engagement of said tool therewith in moving past the element for controlling the operation of said tool moving means and thereby the second movement of said tool.

5. In an article forming apparatus, means for supporting an article to be formed, a plurality of tools, means for advancing said tools successively into operative engagement with the article, a clutch mechanism for controlling said tool advancing means, and means including an element positioned in the path of movement of each of said tools after their successive engagement with the article responsive to an engagement of said tools therewith during their movement past the element for controlling said clutch mechanism.

6. In an article forming apparatus, means for supporting an article to be formed, a plurality of tools, means for rotatably moving said tools successively into predetermined relation with and subsequently into operative engagement with the article, a clutch mechanism for controlling said tool moving means, and means including an element positioned in the path of rotary movement of each of said tools after their successive operative engagement with the article responsive to an engagement of said tools therewith during their movement past the element for causing the clutch mechanism to remain actuated.

7. In an article forming apparatus, a forming tool, means for advancing said tool into predetermined relation with an article, a clutch mechanism for controlling said tool advancing means, a feeler element normally positioned in the path of movement of said tool, connections between said clutch mechanism and said element including an actuator rendered effective for causing the clutch mechanism to remain actuated when the tool engages and moves past the element, and means for operating said actuator when said element is not engaged by said tool, due to the tool being broken off, for actuating said clutch mechanism to interrupt the operation of said tool.

8. In an article forming apparatus, a forming tool, means for moving said tool into operative engagement with an article, means including an element positively movable towards said tool previous to the engagement of the tool with the article responsive to a halting of its movement by an engagement thereof with said tool for permitting the operative engagement of the tool with the article, and means for positively moving said element towards said tool in synchronism with the movement of said tool.

9. In an article forming apparatus, means for supporting and rotating an article, a forming tool, means for advancing said tool into operative engagement with the article, means including an element positively movable towards said tool previous to the engagement of the tool with the article responsive to an engagement of said element with said tool for controlling the advance of said tool into operative engagement with the article, and means for positively moving said element towards said tool in synchronism with the advance of said tool.

10. In an article forming apparatus, means for supporting and rotating an article, a forming tool longitudinally movable into operative engagement with the article, means for longitudinally moving said tool, a clutch mechanism for controlling said tool moving means, a pivotal element positively movable in a direction to cross the path of said tool previous to the engagement of the tool with the article, means for positively moving said element towards said tool in synchronism with the movement of said tool, and connections between said clutch mechanism and said pivotal element including a power driven actuator rendered effective in response to a movement of the element across the path of movement of said tool for actuating the clutch mechanism to interrupt the movement of the tool into operative engagement with the article.

11. In an article forming apparatus, a forming tool, means for relatively moving said tool and an article into operative engagement, a clutch mechanism for controlling the relative movement of said tool and the article, an element positively movable in a direction to cross the path of said tool previous to the engagement of the tool with the article, connections between said clutch mechanism and said element including an actuator for the clutch mechanism normally rendered ineffective to cause an actuation of the clutch when said element in its movement engages a tool and rendered effective when the element moves across the path of movement of said tool, due to the tool being broken off, for actuating the clutch mechanism to interrupt the movement of the tool into operative engagement with the article, and means for positively actuating said element and said actuator in synchronism with the relative movement of the tool and the article.

12. In an article forming apparatus, a forming tool, means for moving said tool into operative engagement with an article, means including an element movable towards said tool previous to the engagement of the tool with the article responsive to a halting of its movement by an engagement thereof with said tool for permitting the operative engagement of the tool with the article, and means including a member yieldably connected to said element for moving said element towards said tool in synchronism with the movement of said tool.

13. In an article working apparatus, a tool, means for relatively moving said tool and an article into operative relation, a clutch mechanism for controlling said means, an element engageable with said tool before said tool operates on the article, connections between said clutch mechanism and said element including a link connected to said element, an actuator for the clutch mechanism operatively associated with one end of said link, said connections and link responsive to an engagement between said element and said tool before said tool engages the article for controlling said actuator and thereby controlling said means for relatively moving said tool and the article.

KASPER F. MOLLER.